United States Patent
Maro et al.

(10) Patent No.: US 6,979,262 B2
(45) Date of Patent: Dec. 27, 2005

(54) RELEASABLE LOCKING APPARATUS

(75) Inventors: Randall A. Maro, Davenport, IA (US); Bryan S. Claerhout, Colona, IL (US)

(73) Assignee: CNH America LLC, Racine, WI (US)

( * ) Notice: Subject to any disclaimer, the term of this patent is extended or adjusted under 35 U.S.C. 154(b) by 134 days.

(21) Appl. No.: 10/789,348

(22) Filed: Feb. 26, 2004

(65) Prior Publication Data

US 2005/0192070 A1 Sep. 1, 2005

(51) Int. Cl.⁷ .......................................... A01F 12/30
(52) U.S. Cl. ............... 460/111; 403/322.1; 403/322.4; 403/325
(58) Field of Search ................. 460/111; 403/321, 403/322.1, 322.4, 323, 324, 325, 327; 292/163, 292/177, 167, 173, 174, 178

(56) References Cited

U.S. PATENT DOCUMENTS

| | | | |
|---|---|---|---|
| 1,955,969 A | 4/1934 | Marzolf ....................... | 287/58 |
| 4,037,488 A | 7/1977 | Laney, Sr. .................... | 74/548 |
| 4,217,064 A | 8/1980 | Hogan ......................... | 403/33 |
| 4,997,203 A | 3/1991 | Jensen ....................... | 280/763.1 |
| 5,263,810 A * | 11/1993 | Takekata et al. ............. | 414/723 |
| 5,301,496 A * | 4/1994 | Sudbrack et al. ............. | 56/366 |
| 5,413,369 A | 5/1995 | Treat .......................... | 280/477 |
| 5,458,431 A * | 10/1995 | Ferreol-Ragotin ....... | 403/322.2 |
| 5,527,074 A * | 6/1996 | Yeh ............................. | 292/177 |
| 5,692,855 A * | 12/1997 | Burton ....................... | 403/325 |
| 6,065,896 A | 5/2000 | Jermyn, Jr. ............... | 403/322.4 |
| 6,557,275 B2 | 5/2003 | Curtis ......................... | 37/231 |
| 2003/0114207 A1 | 6/2003 | Wolters et al. | |

* cited by examiner

Primary Examiner—Árpád Fábián Kovács
(74) Attorney, Agent, or Firm—Brant T. Maurer; Rebecca Henkel (57) ABSTRACT

Locking apparatus adapted for releasably holding a first member, which can be, for instance, a relatively heavy member or device such as a crop residue spreader, in one or more predetermined positions relative to a second member, which can be, for instance, a fixed structure of an agricultural combine, which apparatus when locked and actuated or moved into an unlocking mode will automatically unlock when any forces urging the apparatus to remain in the locked condition are overcome or removed or are otherwise absent, and which when actuated or moved into a locking mode, will automatically lock the members together when in or moved to one of the predetermined positions.

22 Claims, 7 Drawing Sheets

RELEASABLE LOCKING APPARATUS

TECHNICAL FIELD

This invention relates generally to a locking apparatus, and more particularly, to a locking apparatus adapted for releasably locking relatively movable members in at least one predetermined relative position, which apparatus is operable in an unlock or release mode to automatically unlock and release the members when any force opposing the release is removed or otherwise absent, and which is operable in a locking mode for automatically locking the members together when moved to one of the predetermined relative positions.

BACKGROUND ART

Locking apparatus operable for releasably locking together two relatively movable members are well known. Such apparatus can generally be divided into two categories, those providing an automatic unlocking capability in the unlocking mode, and those that provide an automatic locking capability when in a locking mode. Reference as an example in this first regard, Hogan U.S. Pat. No. 4,217,064, issued Aug. 12, 1980, to Spectrum X-Ray Corporation, which discloses a latching mechanism incorporating a pivotal cam operable in a locking position for driving a spring loaded plunger into a receiver for holding two members together. In this mechanism, the spring urges the plunger from the receiver when the cam is moved to an unlock position, to allow the members to be relatively moved. However, the spring loaded plunger must be aligned with the receiver for the cam to be moved to the locking position. Thus, no automatic locking capability is provided.

Reference in the second regard, Jermyn, Jr. U.S. Pat. No. 6,065,896, issued May 23, 2000 to the United States of America, which discloses a lever device having an automatic locking capability when in a locking mode. However, no mechanism is provided for automatically unlocking the device when in an unlock mode.

Here, what is meant by an automatic unlocking capability in an unlocking mode is for the locking apparatus to automatically release or disengage the relatively movable members to allow the relative movement thereof, when or after the apparatus is actuated or moved to an unlocking mode, such as by actuation or movement of an actuating element such as a lever, latch, or the like. What is meant by an automatic locking capability when in a locking mode is to lock the members together when in a selected predetermined relative position when or after the apparatus is actuated or moved to a locking mode by actuation or movement of the actuating element.

There are numerous applications in which it would be advantageous to have a locking apparatus which provides both an automatic locking capability when actuated or moved to an unlocking mode, and an automatic locking capability when moved to a locking mode. As an example, a crop residue spreader is often supported on a rear end of an agricultural combine for movement between one or more operating positions, and a service or access position. Such spreaders are typically relatively heavy devices and require locking apparatus on two sides thereof to be releasably supported in a selected position. Reference in this regard, Wolters et al. U.S. Application Publication No. U.S. 2003/0114207A1, published Jun. 19, 2003, which discloses a multi-position linkage and locking mechanism adapted for such application. This mechanism utilizes spring loaded pins receivable in holes at different locations on a supporting structure when the spreader is moved to one or more predetermined positions, for releasably holding the spreader in the position. To release the spreader, a release bar is moved to a release position to pull the pins from the holes in opposition to the springs. However, in some positions, a substantial portion of the weight of the spreader can be acting to hold the pins in the holes, such that to release the spreader, both the spring forces acting to hold the pins in the holes and the portion of the weight of the spreader acting on the pins must be simultaneously overcome.

Thus, what is sought is a locking apparatus adapted for releasably holding a relatively heavy device such as a crop residue spreader or the like, which is actuatable or movable into an unlocking mode so as to automatically unlock when any forces urging the apparatus to remain in the locked condition are overcome or removed, and when actuated or moved into a locking mode, will automatically lock when the heavy device is moved in a predetermined manner and/or to a predetermined position.

SUMMARY OF THE INVENTION

What is disclosed is locking apparatus adapted for releasably holding a first member, which can be, for instance, a relatively heavy member or device such as a crop residue spreader, in one or more predetermined positions relative to a second member, which can be, for instance, a fixed structure of an agricultural combine, which apparatus when locked and actuated or moved into an unlocking mode will automatically unlock when any forces urging the apparatus to remain in the locked condition are overcome or removed or are otherwise absent, and which when actuated or moved into a locking mode, will automatically lock the members together when in or moved to one of the predetermined positions.

According to a preferred aspect of the invention, the apparatus includes a locking element which is preferably a pin supported on the first member for movement along a predetermined path in a first direction toward the second member to a locking position wherein an end of the locking element or pin will be cooperatively received in a receptacle on the second member when the members are in the at least one predetermined position. The pin is also movable in an opposite second direction away from the second member to an unlocking position wherein the end of the pin will be removed from the receptacle. The apparatus includes an actuating element which is preferably a lever supported on the first member for movement in a direction in opposition to a first resilient biasing element to a release position for applying a resilient biasing force in the second direction against the pin for automatically removing the pin from the receptacle when the biasing force exceeds any opposing force acting to hold the pin in the receptacle, the actuating element or lever being movable in an opposite direction in cooperation with or against the pin to move the pin in the first direction to the locking position. The apparatus includes a second resilient biasing element on the first member disposed for urging the lever in the opposite direction, and a latch supported on the first member for movement between a latching position in engagement with the lever when in the release position for releasably holding the lever in the release position, and an unlatched position disengaged from the lever to allow the second resilient biasing member to automatically move the lever in the opposite direction to move the pin in the first direction including to the locking position when the members are in one of the predetermined relative positions. The biasing elements are preferably each a spring.

According to another preferred aspect of the invention, the first member is movable along a predetermined path relative to the second member, and the second member includes an element which is preferably a cam cooperatively engageable with the latch when in the latching position and the first member is moved to a predetermined position along the path, for moving the latch to the unlatched position such that the lever will be free to be moved by the second resilient biasing element so as to automatically move the end of the pin into the receptacle when the members are moved to one of the predetermined positions. The first member can be movable along the path between two of the predetermined relative positions, and the element on the second member can be disposed between the two predetermined relative positions so as to be engageable with the latch when the first member is moved between the two predetermined positions.

As a result, in operation, when the first and second relatively movable members are locked together by the locking apparatus and a force, which can be, for instance, a substantial portion or all of the weight of one of the members and anything supported thereby, is acting to hold the pin in the receptacle, when the lever is moved to the release position, the resilient biasing force of the first resilient biasing element will act to remove the pin from the receptacle when the opposing force is overcome, removed, or sufficiently diminished. The lever can be maintained in the release position by the latch to effect the unlocking, and then the latch automatically moved to the unlatched position by relative movement of the members in a predetermined manner or along a predetermined path, as desired or required for a particular application. If no opposing force is present when the lever is moved to the release position the pin will be instantaneously removed.

As a preferred element for effecting unlatching of the latch by the relative movement of two members, a cam can be provided on second member at a predetermined location along a path of the relative movement, for cooperatively engaging and moving the latch to the unlatching position.

DETAILED DESCRIPTION OF THE INVENTION

Figure 1:
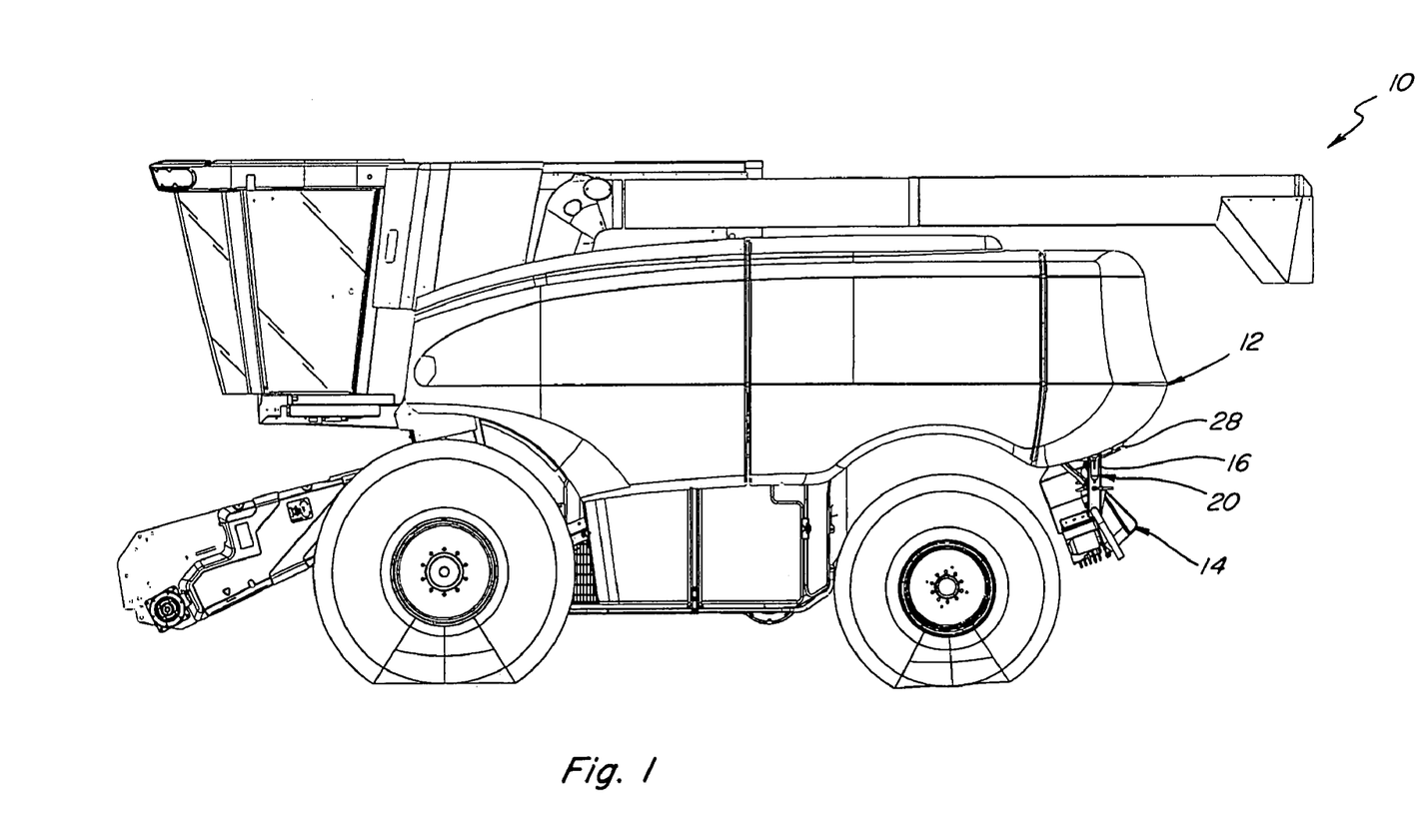
FIG. 1 is a side view of an agricultural combine including locking apparatus for releasably holding a movable crop residue spreader and a first member of the combine in predetermined positions relative to a fixed second member of the combine according to the present invention.
Figure 2:
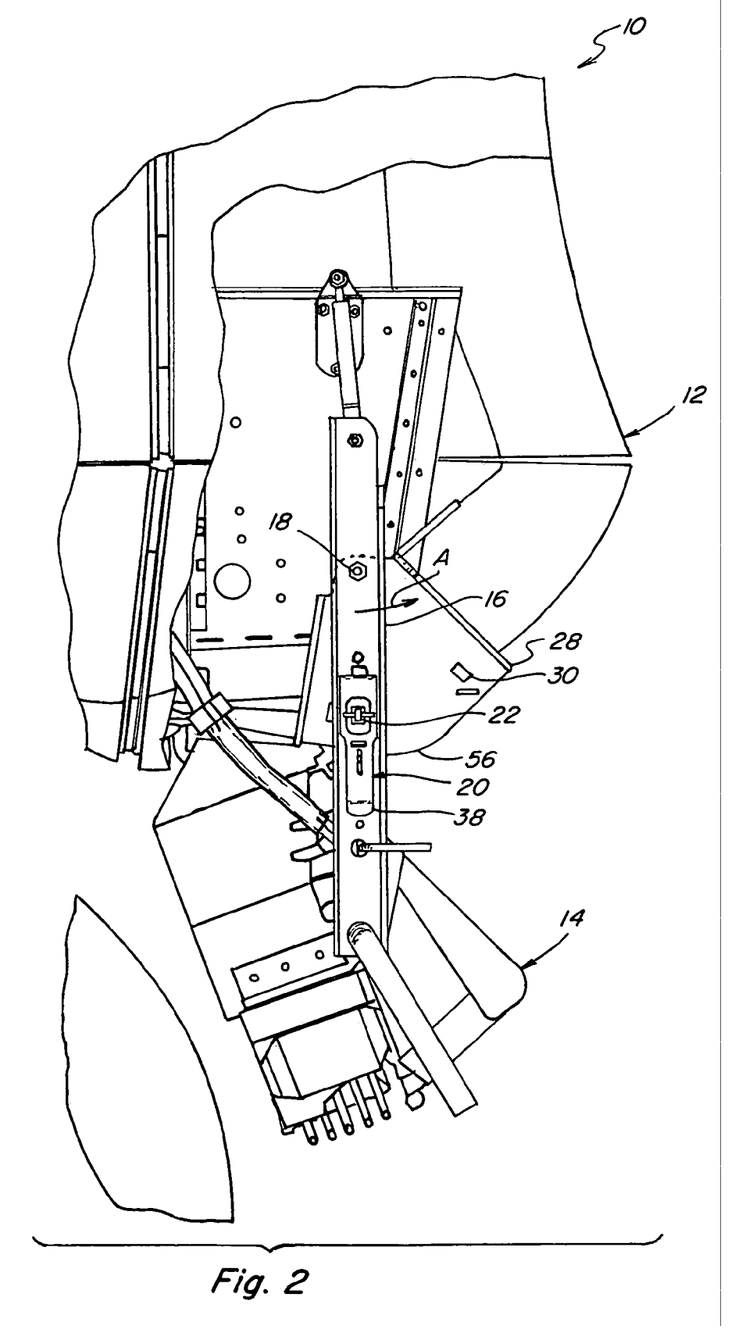
FIG. 2 is an enlarged fragmentary side view of the combine of FIG. 1, showing the locking apparatus and the spreader supported on the first member mounted on the combine for pivotal movement relative to the second member, the locking apparatus releasably holding the first member in a first predetermined position relative to the second member.
Figure 3:
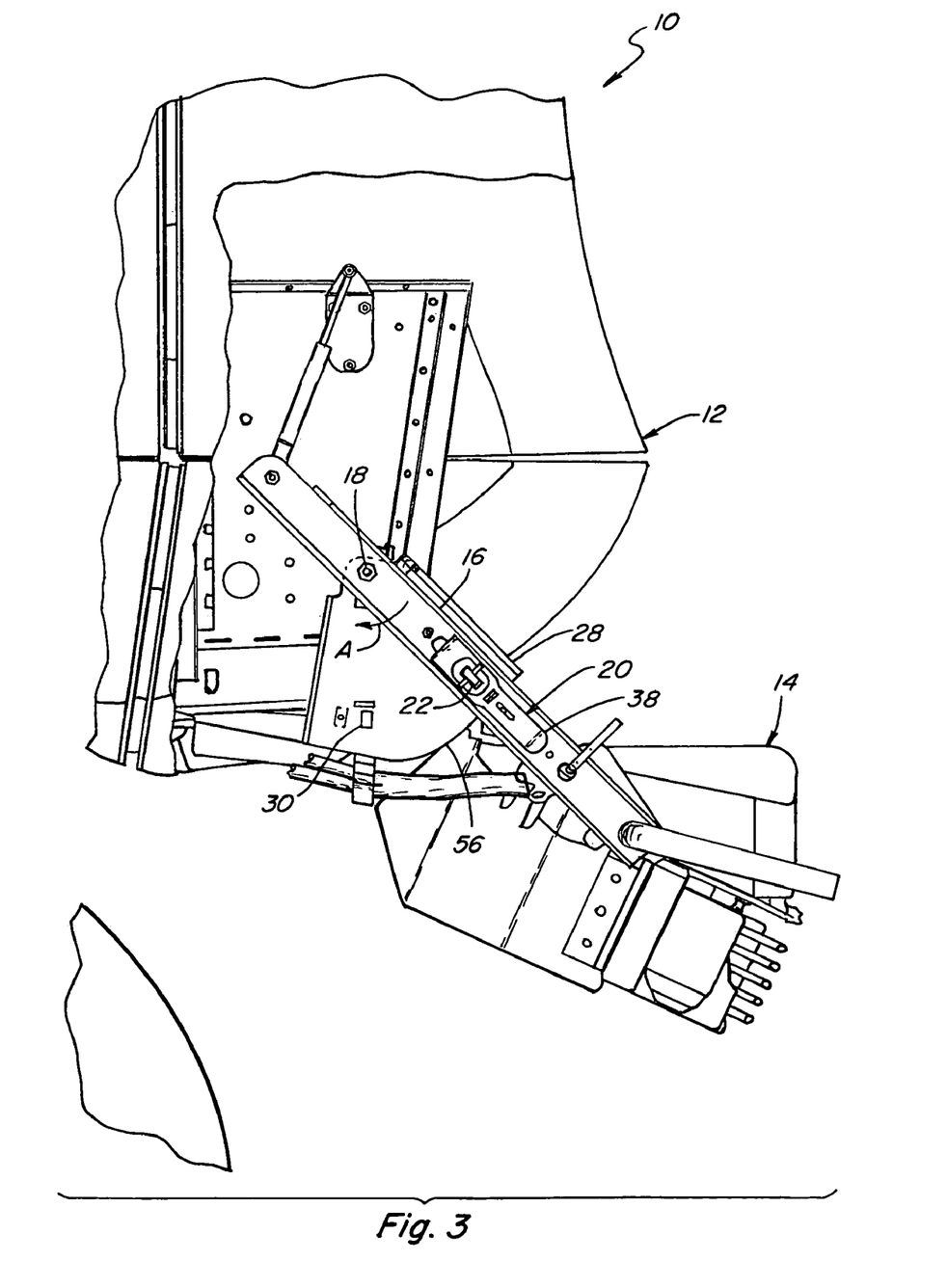
FIG. 3 is an enlarged fragmentary side view of the combine of FIG. 1, showing the locking apparatus and the spreader supported on the first member in a second predetermined position relative to the second member.

Referring now to the drawings, in FIGS. 1, 2 and 3, a representative agricultural combine 10 is shown, having a rear end 12 supporting a crop residue spreader 14 for pivotal movement between several predetermined positions, including, but not limited to, at least one operational crop residue spreading position (FIGS. 1 and 2) and a raised position (FIG. 3) for allowing access to internal components of combine 10 within rear end 12. Spreader 14 is supported by a pair of elongate frame members 16 (one shown) located on opposite sides thereof and mounted for pivotal movement on rear end 12 by a pair of pivot joints 18, in the directions denoted by arrows A in FIGS. 2 and 3. Frame members 16 are each preferably of sheet metal or other rigid construction, and are releasably lockable in a selected one of the predetermined positions by a locking apparatus 20 constructed and operable according to the teachings of the present invention, for holding spreader 14 in the selected position.

Figure 4:
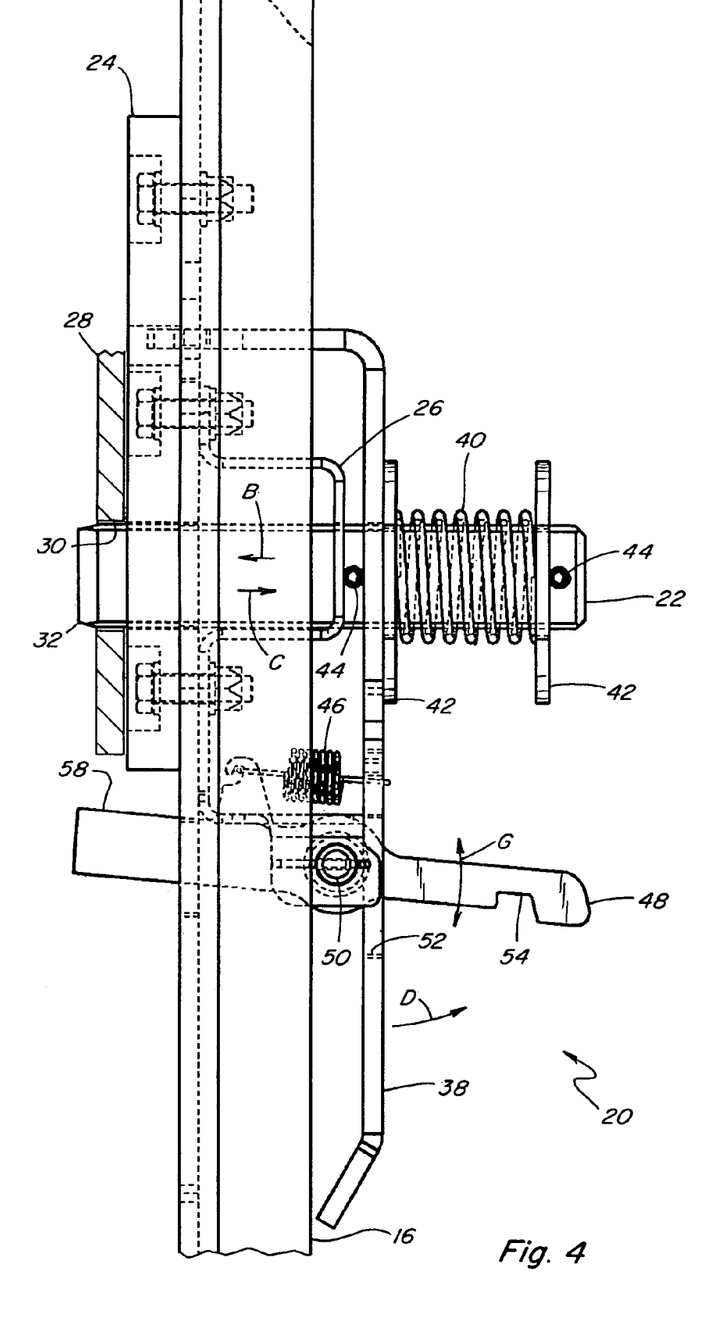
FIG. 4 is an enlarged fragmentary front view of the locking apparatus of FIG. 1 in a locking mode with a locking element of the apparatus releasably received in a receptacle on the second member.
Figure 5:
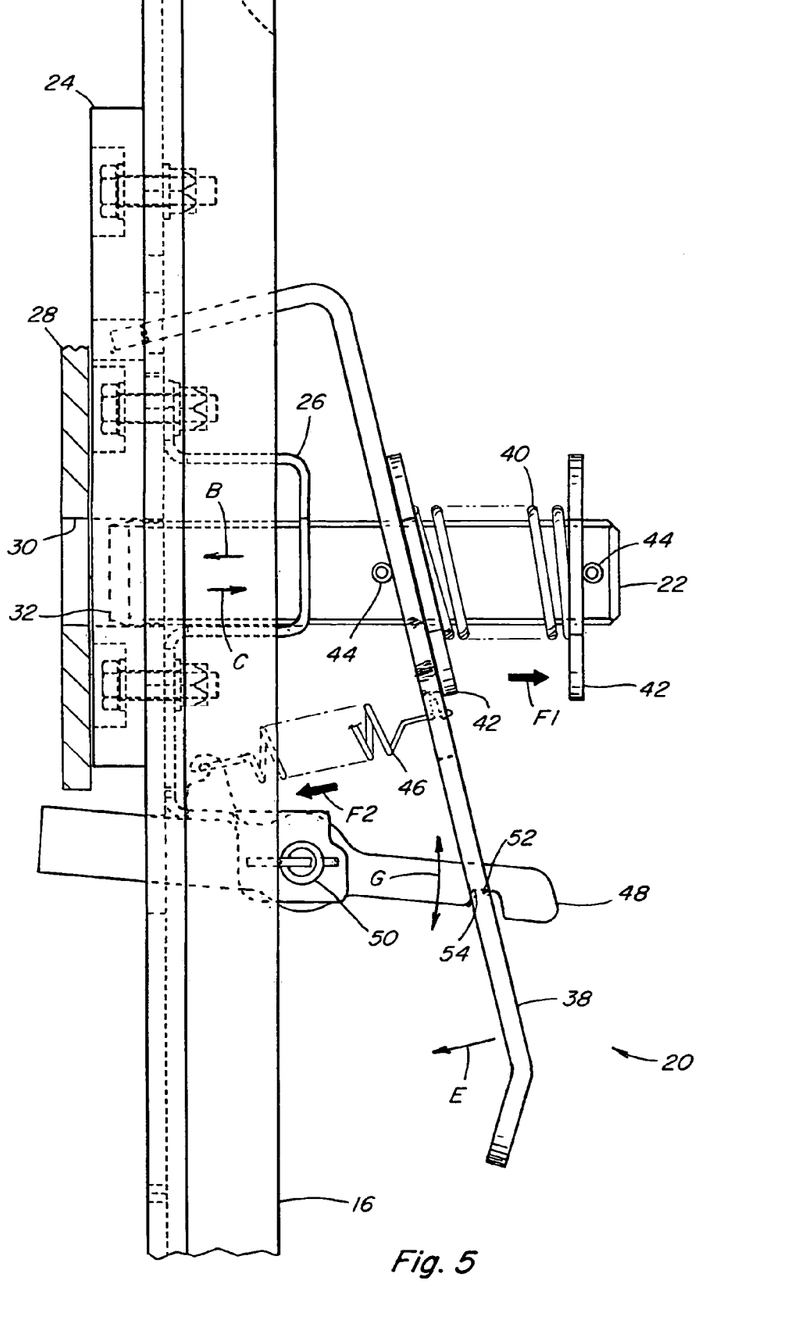
FIG. 5 is another enlarged fragmentary front view of the apparatus of FIG. 1 in an unlocking mode wherein the locking element is withdrawn from the receptacle on the second member to allow pivotal movement of the first member relative thereto.
Figure 6:
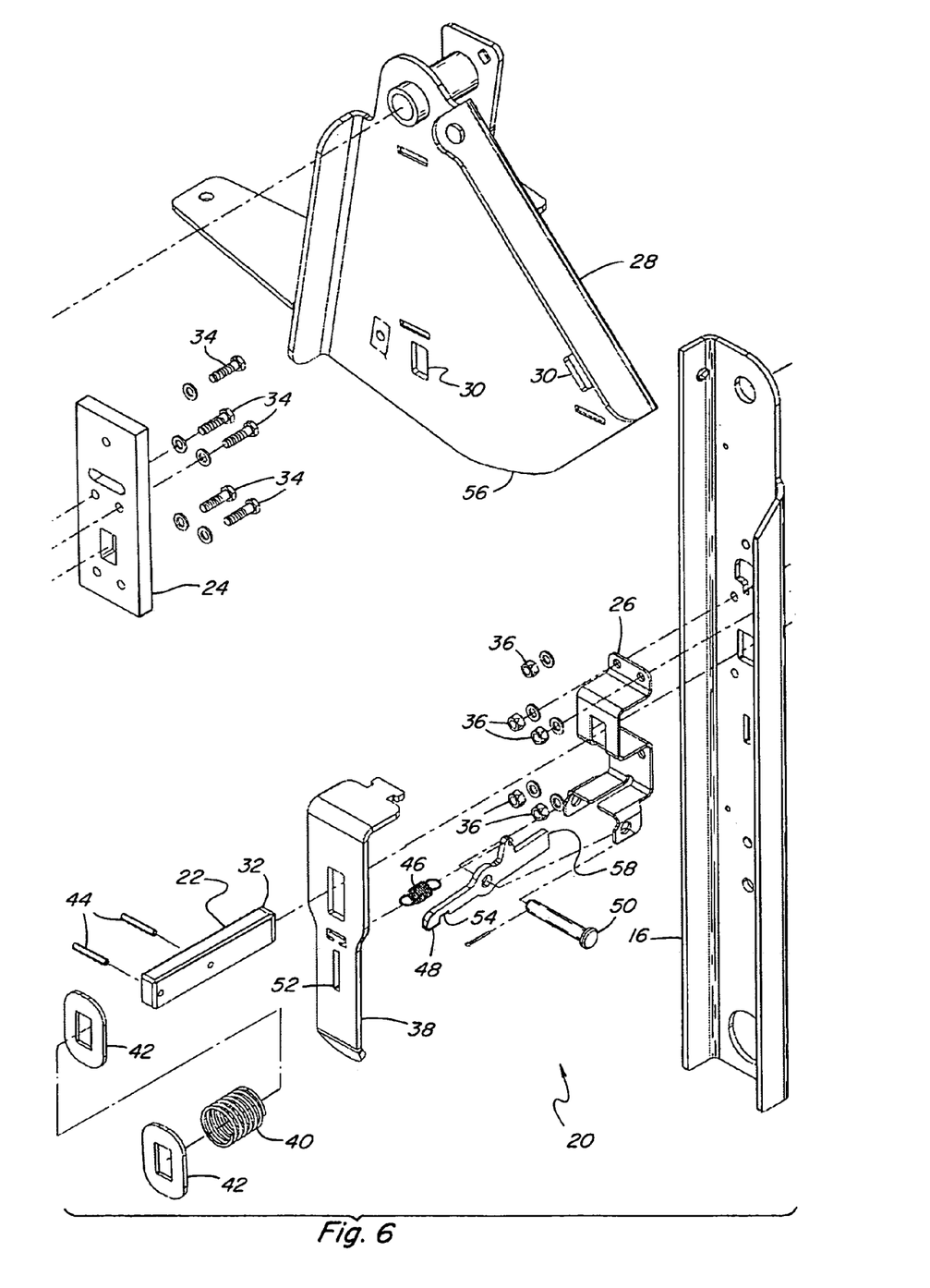
FIG. 6 is an exploded view of the apparatus of FIG. 1, showing the order of installation thereof on the first member and pivotal mounting of the first member relative to the second member.

Referring also to FIGS. 4, 5 and 6, each locking apparatus 20 includes a locking element 22 which is preferably an elongate pin of steel or other rigid hard material and of rectangular cross-section. Locking element 22 is supported by a base 24, which is preferably a plate or sheet of steel or other metal, on one side of frame member 16, and a bracket 26, which is preferably of sheet metal construction, on the opposite side, for movement along a predetermined path in a first direction, denoted by arrows B in FIGS. 4 and 5, toward a second member 28, which can also be of plate or sheet metal construction and which is fixedly mounted on rear end 12, and in an opposite second direction, as denoted by arrows C in FIGS. 4 and 5. Second member 28 includes holes or receptacles 30 therein at spaced locations corresponding to the predetermined positions of spreader 14 and frame member 16, for cooperatively receiving an end 32 of locking element 22 when in a locking position (FIG. 4) for holding spreader 14 and frame member 16 at the predetermined positions, respectively. Locking member 22 is movable in the second direction C away from second member 28 to an unlocking position (FIG. 5) wherein end 32 is removed from receptacle 30, to allow free movement of spreader 14 and frame member 16 relative to second member 28. Base 24 and bracket 26 can be held together on frame member 16 in any suitable manner, for instance, by an array of bolts 34 which pass through holes in base 24, frame member 16 and bracket 26, and secured with nuts 36.

Apparatus 20 includes an actuating element 38, which is preferably a lever, supported on frame member 16 by base 24 and bracket 26, for pivotal movement from a position shown in FIG. 4, in a direction denoted by arrow D, in opposition to a first resilient biasing element 40 to a release position (FIG. 5) for applying a resilient biasing force, denoted by arrow F1, in the second direction against locking element 22 for automatically removing locking element 22 from receptacle 30 when the biasing force F1 exceeds any opposing force acting to hold locking element 22 in receptacle 30. Such opposing force can result from, for instance, locking element 22 bearing a portion of the weight of spreader 14 and frame member 16 such as when spreader 14 is supported in a position such as shown in FIG. 3, and/or friction resulting from contact between, and rust, dirt and/or corrosion on, the surfaces of receptacle 30 and locking element 22. First resilient biasing element 40 is preferably a spring located around locking element 22 and retained in position by spring retainers 42. The outer spring retainer 42 is held on element 22 by a pin 44 which is frictionally retained in a hole through element 22, and the other retainer 42 is held in position by a second pin 44 through another hole in element 22 located adjacent to an opposite surface of actuating element 38. Actuating element 38 is also movable in an opposite direction, denoted by arrow E in FIG. 5, in cooperation with locking element 22, in particular, against and through second pin 44, to move locking element 22 in the first direction B to the locking position. A second resilient biasing element 46, which is also preferably a spring, is disposed in connection between actuating element 38 and a latch 48 mounted for pivotal movement on frame member 16, for urging actuating element 38 in opposite direction E against second pin 44 and locking element 22.

Latch 48 is supported on frame member 16 by a pivot pin 50 which extends through bracket 26 and latch 48, for pivotal movement, denoted by arrows G in FIGS. 4 and 5, between a latching position (FIG. 5) in engagement with actuating element 38 when in the release position, for releasably holding actuating element 38 in that position, and an unlatched position (FIG. 4) disengaged from actuating element 38 to allow second resilient biasing member 46 to exert a biasing force F2 (FIG. 5) against actuating element 38 to automatically move actuating element 38 in opposite direction E to move the locking element in the first direction B including to the locking position when frame member 16 is in one of the predetermined positions relative to member 28, such as illustrated by the positions shown in FIGS. 2 and 3.

Latch 48 and actuating element 38 include suitable elements for holding actuating element 38 in the latching position. Here, latch 48 extends through a hole in actuating element 38 bordered at one end by an edge 52, and includes a notch 54 cooperatively engageable with edge 52, for releasably holding element 38 as shown in FIG. 5. Because second biasing element 46 is connected between actuating element 38 and latch 48, biasing element 46 acts to urge actuating element 38 in direction E and latch 48 in the clockwise direction, which serves to hold edge 52 in notch 54. To release or unlatch actuating element 38, latch 48 is pivoted in the counterclockwise direction to disengage notch 54 from edge 52.

Figure 7:
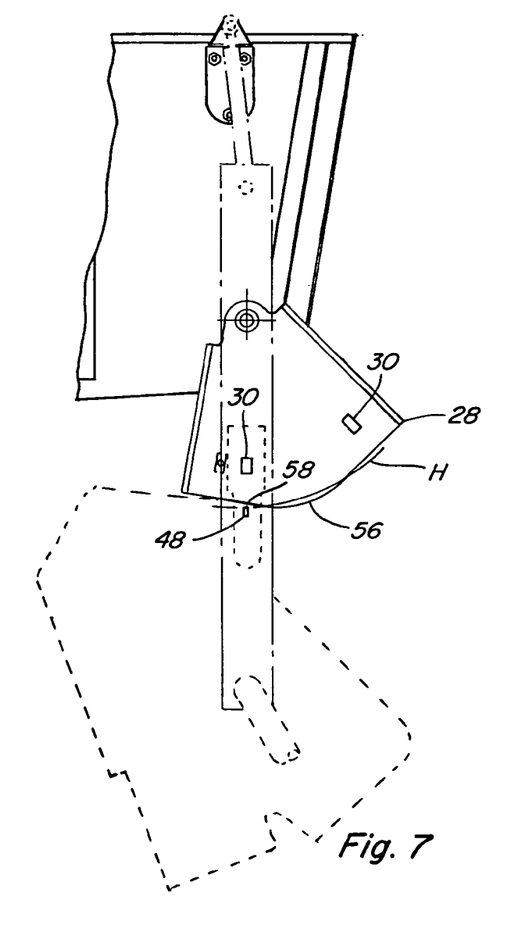
FIG. 7 is a simplified fragmentary schematic representation showing a cam on the second member for moving the locking apparatus to the unlocking mode.
Figure 8:
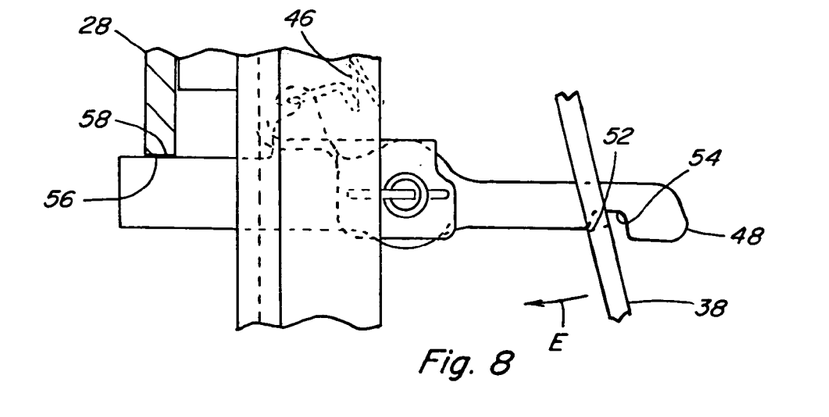
FIG. 8 is another simplified fragmentary representation of the locking apparatus, showing a latch thereof engaged with the cam for releasing the locking element of the apparatus.

Referring also to FIGS. 7 and 8, second member 28 preferably includes an element 56, which is preferably a cam or edge, located along a path of movement of frame member 16, denoted by line H (FIG. 7), at a position so as to cooperatively engage an element 58 on latch 48 (FIG. 8), for pivotally moving latch 48 to disengage edge 52 and notch 54 and move latch 48 from the latched position to the unlatched position, such that actuating element 38 will be urged by second biasing element 46 in direction E. Actuating element 38 will then act to urge locking element 22 in direction B toward second member 28, and, when frame member 16 is moved along path H such that locking element 22 is positioned for entry into one of the receptacles 30 (FIG. 5), actuating element 38 will drive end 32 of locking element 22 into the receptacle 30 (FIG. 4).

As a result, in operation, when frame member 16 and member 28 are locked together by locking apparatus 20 and a force, which can be, for instance, a substantial portion or all of the weight of spreader 14, is acting to hold locking element 22 in receptacle 30, when actuating element 38 is moved to the release position, the resilient biasing force of first resilient biasing element 40 will act to automatically remove locking element 22 from receptacle 30 when the opposing force is overcome, removed, or sufficiently diminished. If no opposing force is present when actuating element 38 is moved to the release position, locking element 22 will be instantaneously removed from the receptacle to the position shown in FIG. 5. Actuating element 38 can be maintained in the release position by latch 48 to enable or facilitate the unlocking, for instance, to allow a person to lift spreader 14 and frame member 16 to remove or lessen the opposing force. Then, latch 48 can be moved to the unlatched position either manually, or by movement of frame member 16 along path H, to effect automatic locking when locking element 22 is positioned for entry into one of the receptacles 30.

Here, it should be remembered that in the representative example, a locking apparatus 20 is located on a each side of spreader 14, and that element 38 of each apparatus 20 must be actuated or moved in the above described manner to its locking and unlocking modes. It should also be noted that in the locked mode shown in FIG. 4, locking element 22 can be maintained in receptacle 30 by biasing forces exerted by one or both of biasing elements 40 and 46, as desired or required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A locking apparatus for releasably holding first and second relatively movable members in at least one predetermined relative position, comprising:

a locking element supported on the first member for movement along a predetermined path in a first direction toward the second member to a locking position wherein an end of the locking element will be cooperatively received in a receptacle on the second member when the members are in the at least one predetermined position, and in an opposite second direction away from the second member to an unlocking position wherein the end of the locking element will be removed from the receptacle;

an actuating element supported on the first member for movement in a direction in opposition to a first resilient biasing element to a release position for applying a resilient biasing force in the second direction against the locking element for automatically removing the locking element from the receptacle when the biasing force exceeds any opposing force acting to hold the locking element in the receptacle, the actuating element being movable in an opposite direction in cooperation with the locking element to move the locking element in the first direction to the locking position;

a second resilient biasing element on the first member disposed for urging the actuating element in said opposite direction; and a latch supported on the first member for movement between a latching position in engagement with the actuating element when in the release position for releasably holding the actuating element in the release position, and an unlatched position disengaged from the actuating element to allow the second resilient biasing member to automatically move the actuating element in said opposite direction to move the locking element in the first direction including to the locking position when the members are in one of the predetermined relative positions.

2. The apparatus of claim 1, wherein the first member is movable along a predetermined path relative to the second member, and the second member includes an element cooperatively engageable with the latch when in the latching position and the first member is moved to a predetermined position along the path, for moving the latch to the unlatched position such that the actuating element will be free to be moved by the second resilient biasing element so as to automatically move the end of the locking element into the receptacle when the members are moved to one of the predetermined positions.

3. The apparatus of claim 2, wherein the first member is movable along the path between two of the predetermined relative positions, and the element on the second member is disposed between the two predetermined relative positions so as to be engageable with the latch when the first member is moved between the two predetermined positions.

4. The apparatus of claim 2, wherein the element on the second member comprises a cam.

5. The apparatus of claim 3, wherein the locking element comprises a pin and the actuating element comprises a lever mounted for pivotal movement on the first member in the direction in opposition to the first resilient biasing element and in the opposite direction against the pin.

6. The apparatus of claim 5, wherein the direction in opposition to the first resilient biasing member is the first direction and the opposite direction is the second direction.

7. The apparatus of claim 1, wherein the first resilient biasing element comprises a spring.

8. The apparatus of claim 1, wherein the second resilient biasing element comprises a spring.

9. A locking apparatus for releasably holding first and second relatively movable members in at least one predetermined relative position, comprising:

a base mountable on the first member so as to be located in predetermined relation to a receptacle on the second member when the members are in the at least one predetermined relative position;

a pin supported on the base for movement along a predetermined path in a first direction toward the second member to a locking position wherein an end of the pin will be cooperatively received in the receptacle when the members are in the at least one predetermined position, and in an opposite second direction away from the second member to an unlocking position wherein the end of the pin will be removed from the receptacle;

a lever supported on the base for pivotal movement in the first and second directions, including in the second direction in opposition to a first resilient biasing member to a release position for applying a resilient biasing force in the second direction against the pin for automatically removing the pin from the receptacle when the biasing force exceeds any opposing force acting to hold the pin in the receptacle, the lever when moved in the first direction being engageable with the pin to move the pin in the first direction to the locking position;

a second resilient biasing element resiliently urging the lever in the first direction when in the release position; and a latch supported on the base for movement between a latching position in engagement with the lever when in the release position for releasably holding the lever in the release position, and an unlatched position disengaged from the lever to allow the second resilient biasing member to automatically move the lever against the pin to move the pin in the first direction including to the locking position when the members are in one of the predetermined relative positions.

10. The apparatus of claim 9, wherein the second member includes an element cooperatively engageable with the latch when in the latching position and the first member is moved to a predetermined position in relation to the second member, for moving the latch to the unlatched position to disengage from the lever such that the lever and the pin will be urged in the first direction by the second resilient biasing element so as to move the end of the pin into the receptacle when the members are in the predetermined position.

11. The apparatus of claim 10, wherein the members are movable between two of the predetermined relative positions, and the element on the second member engageable with the latch is disposed between the two predetermined relative positions.

12. The apparatus of claim 10, wherein the element on the second member comprises a cam.

13. The apparatus of claim 12, wherein the second member is mounted at a fixed location on a work machine and the first member comprises a frame member supported on the work machine for movement relative to the second member in adjacent relation thereto through a range of positions including the predetermined position relative to the second member.

14. The apparatus of claim 13, wherein the frame member supports a crop residue spreader.

15. The apparatus of claim 10, wherein the lever is supported on the first member for pivotal movement in the first and second directions.

16. The apparatus of claim 10, wherein the first and second resilient biasing elements comprise springs.

17. A locking apparatus for releasably holding a movable first member in at least one predetermined position relative to a fixed second member, comprising:

a pin supported on the first member for movement along a predetermined path in a first direction toward the second member to a locking position wherein an end of the pin will be cooperatively received in a receptacle on the second member when the first member is in the at least one predetermined position, and in an opposite second direction away from the second member to an unlocking position wherein the end of the pin will be removed from the receptacle;

a lever supported on the first member for movement in a direction in opposition to a first spring to a release position for applying a first spring force in the second direction against the pin for removing the pin from the receptacle when the first spring force exceeds any opposing force acting to hold the pin in the receptacle, and in an opposite direction against the pin for moving the pin in the first direction to the locking position;

a second spring on the first member disposed for applying a second spring force against the lever for resiliently urging the lever in said opposite direction; and a latch supported on the first member for movement between a latching position for engaging the lever when in the release position for releasably holding the lever therein, and an unlatched position disengaged from the lever, the latch being movable from the latching position to the unlatched position by movement of the first member in a predetermined manner relative to the second member such that the lever and the pin will be urged in the first direction by the second spring so as to move the end of the pin into the receptacle when the first member is moved into one of the predetermined positions relative to the second member.

18. The apparatus of claim 17, wherein the first member is movable in the predetermined manner by movement between two of the predetermined positions relative to the second member.

19. The apparatus of claim 17, wherein the second member includes a cam engageable with the lever for moving the lever to the unlatched position when the first member is moved in the predetermined manner.

20. A method for unlocking locked together first and second members to allow relative movement thereof, and locking the members together when moved to a predetermined position, comprising the steps of:

(a) providing a locking apparatus on the first member including a locking element movable between a locking position wherein an end of the locking element is receivable in a receptacle on the second member for locking the members together, and a release position wherein the end of the locking element will be removed from the receptacle to allow relative movement of the members, the locking apparatus being operable in a locking mode for resiliently urging the locking element toward the locking position and in an unlocking mode for applying a resilient biasing force against the locking element toward the release position so as to remove the end of the locking element from the receptacle when any force opposing the biasing force is overcome thereby, the locking apparatus being automatically movable from the unlocking mode to the locking mode by relative movement of the first and second members;

(b) operating the locking apparatus in the unlocking mode such that the end of the locking element will be removed from the receptacle when the biasing force overcomes any opposing force; then, (c) relatively moving the first and second members to automatically move the locking apparatus to the locking mode; and (d) relatively moving the first and second members to position the members in the predetermined position such that the end of the locking element will be received in the receptacle on the second member for locking the members together.

21. The method of claim 20, wherein the locking apparatus further comprises an actuating element latchable in a release position for applying the resilient biasing force against the locking element toward the release position so as to remove the end of the locking element from the receptacle when any force opposing the biasing force is overcome.

22. The method of claim 21, wherein the second member and the locking apparatus include elements cooperatively engageable when the first and second members are relatively moved in a predetermined manner, for unlatching the actuating element to move the locking apparatus to the locking mode, such that further relative movement of the members to the predetermined position will allow the locking apparatus to lock the members together.

* * * * *